(12) United States Patent
Huang et al.

(10) Patent No.: US 7,826,968 B2
(45) Date of Patent: Nov. 2, 2010

(54) METHOD, DEVICE AND VEHICLE UTILIZING THE SAME

(75) Inventors: Peng-Chuan Huang, Hsinchu (TW); Chao Chieh Hsu, Taipei County (TW); Hong-Hui Chen, Taipei Hsien (TW)

(73) Assignee: Mediatek Inc., Hsin-Chu (TW)

( * ) Notice: Subject to any disclaimer, the term of this patent is extended or adjusted under 35 U.S.C. 154(b) by 809 days.

(21) Appl. No.: 11/741,926

(22) Filed: Apr. 30, 2007

(65) Prior Publication Data
US 2008/0270024 A1    Oct. 30, 2008

(51) Int. Cl.
G01C 21/34    (2006.01)
G01S 5/02    (2010.01)

(52) U.S. Cl. .................. 701/213; 701/214; 340/993; 342/357.12

(58) Field of Classification Search .................. 701/213, 701/214, 207, 209; 340/992, 993; 342/357.12
See application file for complete search history.

(56) References Cited

U.S. PATENT DOCUMENTS

| | | | |
|---|---|---|---|
| 5,592,173 A | | 1/1997 | Lau et al. |
| 5,862,511 A * | | 1/1999 | Croyle et al. ................. 701/213 |
| 5,948,043 A * | | 9/1999 | Mathis ....................... 701/208 |
| 6,448,927 B1 * | | 9/2002 | Ishigaki et al. ......... 342/357.06 |
| 6,559,794 B1 * | | 5/2003 | Nakajima et al. ...... 342/357.06 |
| 6,633,814 B2 | | 10/2003 | Kohli et al. |
| 6,662,107 B2 | | 12/2003 | Gronemeyer |
| 6,774,838 B2 | | 8/2004 | Sun |
| 6,795,941 B2 | | 9/2004 | Nickels et al. |
| 6,812,887 B2 | | 11/2004 | Syrjarinne et al. |
| 7,071,087 B2 | | 7/2006 | Horslund et al. |
| 7,084,810 B2 * | | 8/2006 | Kitatani ................. 342/357.12 |
| 7,123,189 B2 * | | 10/2006 | Lalik et al. ............. 342/357.13 |
| 2004/0073361 A1 * | | 4/2004 | Tzamaloukas et al. ...... 701/210 |
| 2008/0201066 A1 | | 8/2008 | Kanazawa |

* cited by examiner

*Primary Examiner*—Tan Q Nguyen
(74) *Attorney, Agent, or Firm*—Thomas, Kayden, Horstemeyer & Risley

(57) ABSTRACT

A global positioning system (GPS) device including an antenna and a baseband unit is disclosed. The antenna receives a wireless signal group. The baseband unit processes the wireless signal group to generate a position signal. The position signal is updated every time interval. The duration of the time interval is changed dynamically.

9 Claims, 5 Drawing Sheets

METHOD, DEVICE AND VEHICLE UTILIZING THE SAME

BACKGROUND OF THE INVENTION

1. Field of the Invention

The invention relates to a method, a global positioning system (GPS) device, and a vehicle, and more particularly to a method, a GPS device, and a vehicle capable of utilizing the global positioning system (GPS) device.

2. Description of the Related Art

Global Positioning System (GPS) receivers determine location, velocity, and time by receiving and processing information in GPS signals received from GPS satellites that have been placed in orbit around the Earth by the United States Government. The GPS signal from each satellite carries data for the location-in-space of the satellite and time-of-transmission on carrier frequencies that are the same for all the satellites. The data from each satellite is spread with a pseudo-random noise (prn) code that is distinct for that satellite. A GPS receiver uses the distinct prn code for distinguishing between GPS signals from typically at least four satellites and then determines its own location, velocity, and time by solving simultaneous equations using the relative times of the signals from each of the satellites arriving at the receiver and the locations-in-space and times-of-transmission from the satellites.

For the purposes of illustration, assume the GPS receiver finds and then updates its own position every one second. If the GPS receiver moves much faster, it is not able to immediately locate its own position. To immediately locate the position of the GPS receiver, the position locating frequency is increased. For example, the GPS receiver locates and then updates its own position every 0.1 seconds. More frequent updates, however, increase power consumption.

BRIEF SUMMARY OF THE INVENTION

A method and device are provided. An exemplary embodiment of a global positioning system (GPS) device comprises an antenna and a baseband unit. The antenna receives a wireless signal group. The baseband unit processes the wireless signal group to generate a position signal. The position signal is updated every time interval. The duration of the time interval is changed dynamically.

An exemplary embodiment of a method for the described GPS device is described in the following. A wireless signal group is received. The wireless signal group is processed to generate a position signal. The position signal is updated every time interval. The duration of the time interval is changed dynamically.

Vehicles are also provided. An exemplary embodiment of vehicle provides a direction signal to the described GPS device. The baseband unit generates the position signal according to the processed result and the direction signal.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
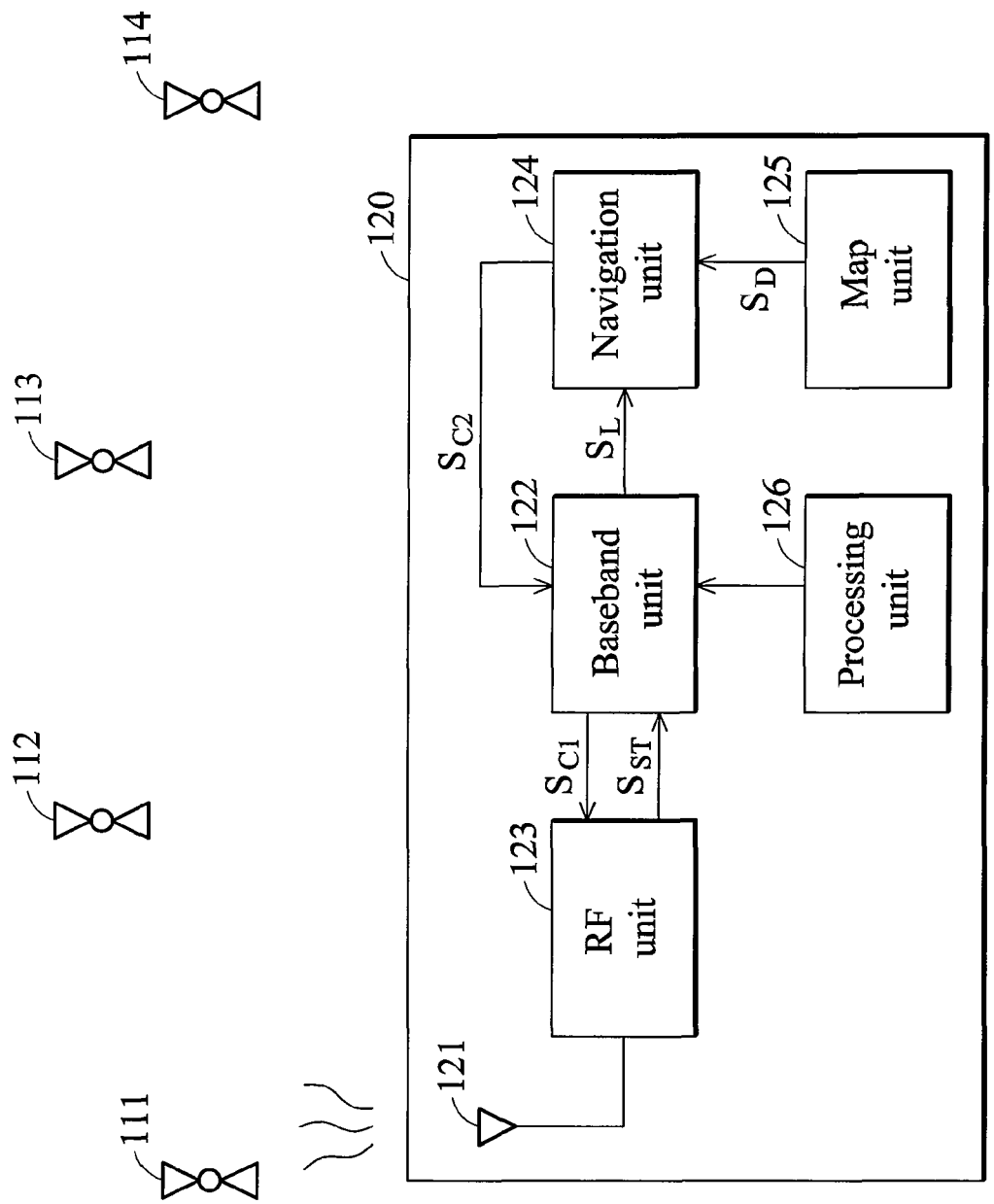
FIG. 1 is a schematic diagram of an exemplary embodiment of a global positioning system (GPS) device.

FIG. 1 is a schematic diagram of an exemplary embodiment of a global positioning system (GPS) device. The GPS device 100 comprises an antenna 121 and a baseband unit 122. Antenna 121 receives a wireless signal group. In this embodiment, antenna 121 continuously receives the wireless signal group provided by satellites 111~114. In some embodiments, antenna 121 determines whether to receive the wireless signal group according to a control signal (not shown). The control signal is provided by baseband unit 122 or other elements. When the control signal is activated, antenna 121 receives the wireless signal group. When the control signal is de-activated, antenna 121 does not receive the wireless signal group. Baseband unit 122 processes the wireless signal group to generate a position signal $S_L$. The position signal is updated every time interval. The duration of the time interval is changed dynamically to control the times of the position signal $S_L$ generated by baseband unit 122 during a one second period, or the position locating frequency of the GPS device 100. In this embodiment, the duration of the time interval is changed according to a speed of movement or a direction of movement of the GPS device 100, a remaining battery capacity (not shown) of the GPS device 100, or the number of the satellites.

Figure 2A:
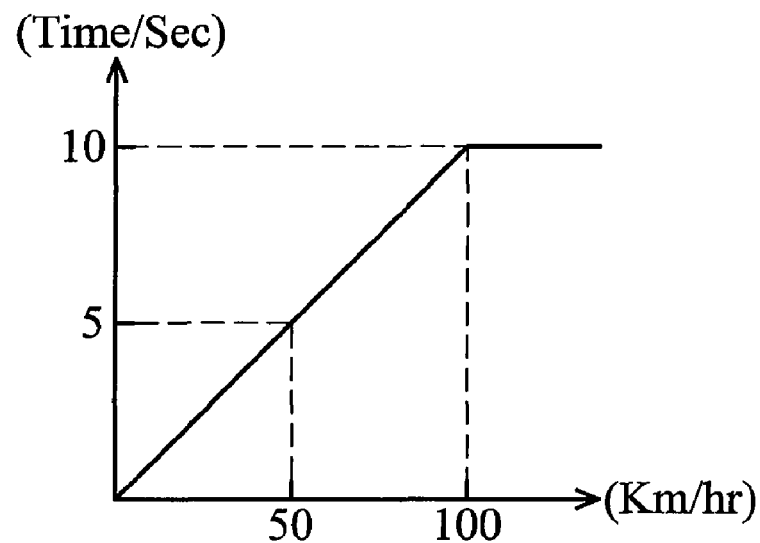
FIG. 2A shows a mapping function corresponding to instances of generating a position signal by the baseband unit 122 during a one second period and the speed of movement of movement of the GPS device 100.
Figure 2B:
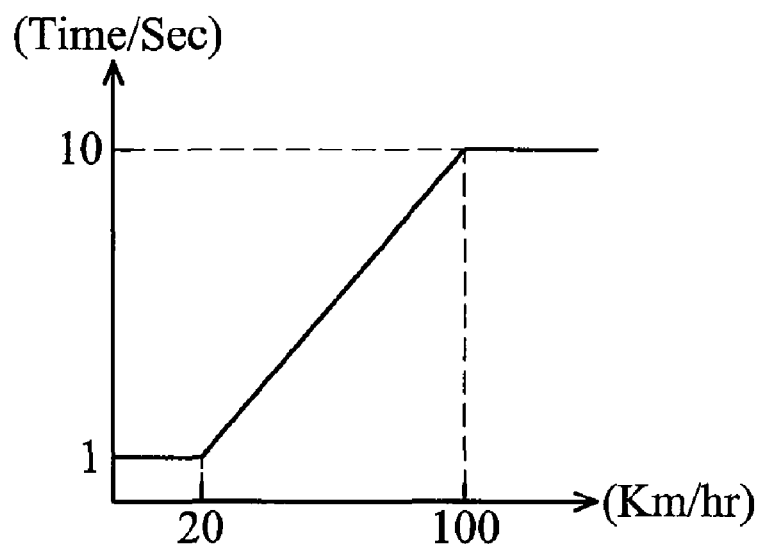
FIG. 2B shows another mapping function corresponding to instances of generating a position signal by baseband unit 122 during a one second period and the speed of movement of the GPS device 100.

For example, the speed of movement of the GPS device 100 is obtained according to two sets of position signals generated by baseband unit 122. When the speed of movement of the GPS device 100 exceeds a preset value, the duration of the time interval is reduced in order to more quickly obtain the position of the GPS device 100. FIG. 2A shows a mapping function corresponding to instances of generating a position signal by baseband unit 122 during a one second period and the speed of movement of the GPS device 100. When the speed of movement of the GPS device 100 exceeds 100 (Km/hr), the position signal is generated by baseband unit 122 10 times during a one second period. In other words, the position signal is generated by baseband unit 122 once every 0.1 seconds. Thus, the position locating frequency of the GPS device 100 is 10 Hz. When the speed of movement of the GPS device 100 is approximately 50(Km/hr), the position signal is generated by baseband unit 122 5 times during a one second period. In other words, the position signal is generated by baseband unit 122 once every 0.2 seconds. Thus, the position locating frequency of the GPS device 100 is 5 Hz. In summary, the frequency of generating the position signal by baseband unit 122 is higher when the speed of movement of the GPS device 100 is faster. FIG. 2B shows anther mapping function corresponding to instances of generating a position signal by baseband unit 122 during a one second period and the speed of movement of the GPS device 100. When the speed of movement of the GPS device 100 is less than a preset value, such as 20(Km/hr), the position signal is generated by baseband unit 122 once during a one second period.

Figure 3:
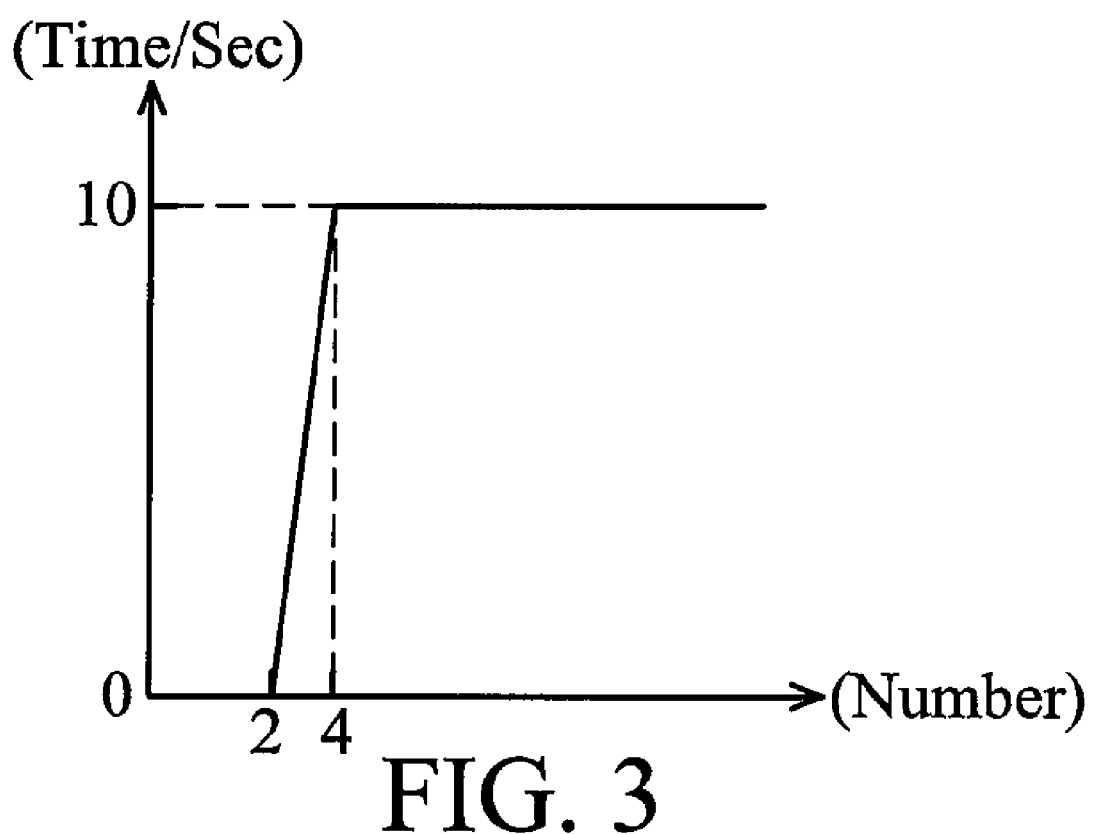
FIG. 3 shows a mapping function corresponding to instances of generating a position signal by baseband unit 122 during a one second period and the number of satellites.

In some embodiments, the duration of the time interval corresponds to the intensity of the wireless signal group. When the wireless signal group is provided by two satellites, baseband unit 122 is unable to generate the position signal $S_L$. Thus, the duration of the time interval is increased to reduce power consumption. FIG. 3 shows a mapping function corresponding to instances of generating a position signal by baseband unit 122 during a one second period and the number of satellites. When four satellites provide the wireless signal group, the position signal is generated by baseband unit 122 10 times during a one second period. Thus, the position locating frequency of the GPS device 100 is 10 Hz. When two satellites provide the wireless signal group, baseband unit 122 stops generating the position signal. Thus, the position locating frequency of the GPS device 100 is 0 Hz. In some embodiments, when two satellites provide the wireless signal group, the position signal is generated by baseband unit 122 only once by a long time interval. In other words, the position locating frequency of the GPS device 100 is a minimum frequency more than 0 Hz.

As shown in FIG. 1, the GPS device 100 further comprises a radio frequency (RF) unit 123, a navigation unit 124, a map unit 125, and a processing unit 126. In some embodiments, the GPS device 100 selectively comprises one or a combination of RF unit 123, navigation unit 124, map unit 125, and processing unit 126 according to user requirements.

RF unit 123 is coupled between antenna 121 and baseband unit 122 to transform the wireless signal group. Baseband unit 122 receives a transforming signal generated by RF unit 123 for generating the position signal. Because baseband unit 122 generates the position signal $S_L$ by a time interval, RF unit 123 generates the transforming signal by the time interval. In this embodiment, RF unit 123 transforms the wireless signal group to generate a transforming signal $S_{ST}$ when receiving the control signal $S_{C1}$ provided by baseband unit 122.

Navigation unit 124 displays the position of the GPS device 100 on a display panel (not shown) according to the position signal $S_L$ and a map information $S_D$ provided by map unit 125. The display panel not only displays a map, the display unit also displays the position of the GPS device 100. Thus, a movement path of the GPS device 100 is immediately obtained by a user.

Figure 4A:
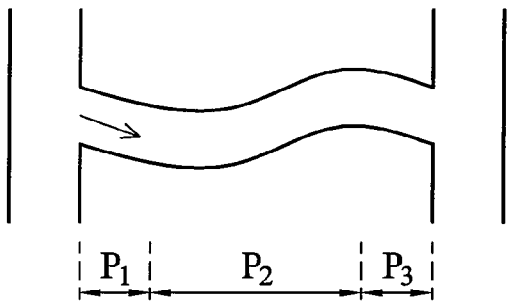
FIG. 4A is a schematic diagram of a path of movement.

When the GPS device 100 moves along a specific path, such as on a straight road or a curvy road, navigation unit 124 provides a control signal $S_{C2}$ to baseband unit 122 for changing the duration of the time interval. FIG. 4A is a schematic diagram of a path of movement. Assuming a vehicle utilizing the GPS device 100 moves to the direction of the arrow in FIG. 4A. Because the moving path is confined, the path of movement is divided into a plurality of segments. For example, the path of movement is divided into a beginning segment $P_1$, a middle segment $P_2$, and an end segment $P_3$.

In the beginning segment $P_1$, the probability of changing the direction of movement of the GPS device 100 is gradually reduced such that the number of times the position signal is generated by baseband unit 122 during a one second period is gradually reduced, or the duration of the time interval is increased. Thus, the position locating frequency of the GPS device 100 is gradually reduced. In the middle segment $P_2$, the probability of changing the direction of movement is lower such that the number of times the position signal is generated by baseband unit 122 during a one second period is maintained at a preset value. Thus, the position locating frequency of the GPS device is reduced. In some embodiments, baseband unit 122 stops generating the position signal. Thus, the position locating frequency of the GPS device 100 is zero. In the end segment $P_3$, the probability of changing the direction of movement is gradually increased such that the number of times the position signal is generated by baseband unit 122 during a one second period is gradually increased, or the duration of the time interval is reduced. Thus, the position locating frequency of the GPS device is gradually increased to obtain the correct position of the GPS device 100.

Figure 4B:
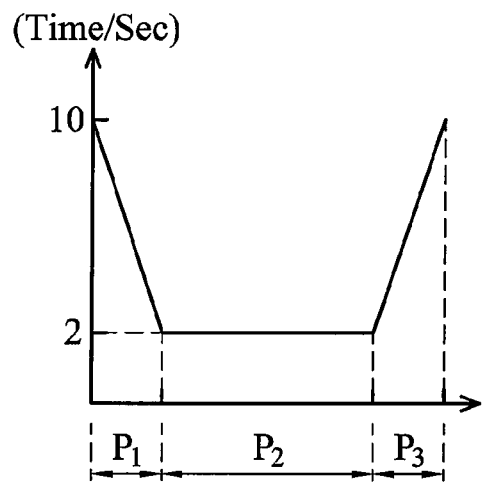
FIG. 4B shows a mapping function corresponding to instances of generating a position signal by baseband unit 122 during a one second period and only one path.

FIG. 4B shows a mapping function corresponding to instances of a position signal generated by baseband unit 122 during a one second period and only one path. In the beginning segment $P_1$, the position locating frequency of the GPS device 100 is gradually reduced from 10 Hz to 2 Hz. In the middle segment $P_2$, the probability of changing the direction of movement is lower, thus, the position locating frequency of the GPS device 100 is maintained at 2 Hz. In the end segment $P_3$, since the probability of changing the direction of movement is higher, the frequency of generating the position signal is increased. Thus, the position locating frequency of the GPS device 100 is gradually increased from 2 Hz to 10 Hz.

Figure 4C:
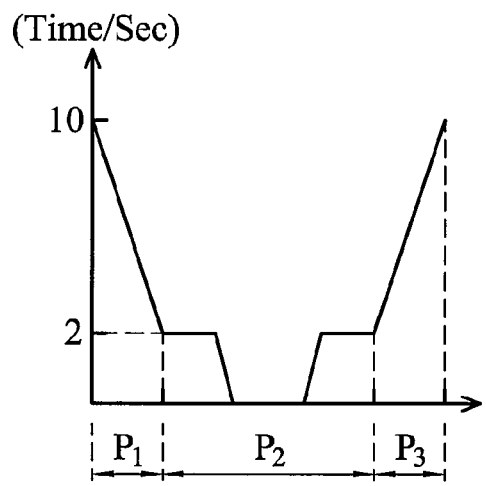
FIG. 4C shows another mapping function corresponding to instances of generating a position signal by baseband unit 122 during a one second period and only one path.

FIG. 4C shows another mapping function corresponding to instances of generating a position signal by baseband unit 122 during a one second period and only one path. FIG. 4C is similar to FIG. 4B with the exception that the position locating frequency of the GPS device 100 is not maintained in the middle segment $P_2$. As shown in FIG. 4C, when the GPS device 100 moves in a beginning section of the middle segment $P_2$, the position locating frequency of the GPS device 100 is maintained at 2 Hz and the position locating frequency of the GPS device 100 is then reduced to 0 Hz. When the GPS device 100 moves in an end section of the middle segment $P_2$, the position locating frequency of the GPS device 100 is increased from 0 Hz to 2 Hz.

With the map information provided by the map unit 125 (shown in FIG. 1), the position of a moving car along a specific path can be determined by V*T, where V is the velocity of the car and T is the time period. The velocity of a car can be obtained by the velocity detector inherently equipped in the car. V can be a function of time. That is, V can vary with time. The total path the car travels would be an integration of $\Delta V * \Delta t$. Therefore, position locating is not needed under this situation and the position locating frequency can be 0 Hz.

In another embodiment, if an object (a car for example) is moving at a constant speed Vc, the total traveling path would be Vc*T. For example, some cars have a constant speed cruise mode. That is, under this mode, a car can move at a constant speed unless the user steps on the brake. When the car is in the constant speed cruise mode, a constant speed signal can be sent to the GPS device 100 and the GPS device 100 stops position locating from the satellites. The GPS device 100 obtains the constant speed Vc before the car enters the constant speed cruise mode. The constant speed Vc is determined by prior position locating information. The GPS device 100 determines the position of the car according to the constant speed Vc, the elapsed time T, and the map information. If the user deactivates the constant speed cruise mode, the GPS device 100 resumes position locating from satellites.

In some embodiments, the position locating frequency of the GPS device 100 is determined according to a remaining capacity of a battery (not shown) of the GPS device 100. As shown in FIG. 1, processing unit 126 detects the remaining capacity of the battery. The duration of the time interval is changed according to the detected result. When the remaining capacity of the battery exceeds a preset value, the duration of the time interval is reduced. Similarly, if the remaining capacity of the battery is less than the preset value, the duration of the time interval is lengthened. If a user does not want to lower the position locating frequency, he can choose to deactivate the function mentioned above and maintain the same position locating frequency while the remaining capacity of the battery is low.

Figure 5:
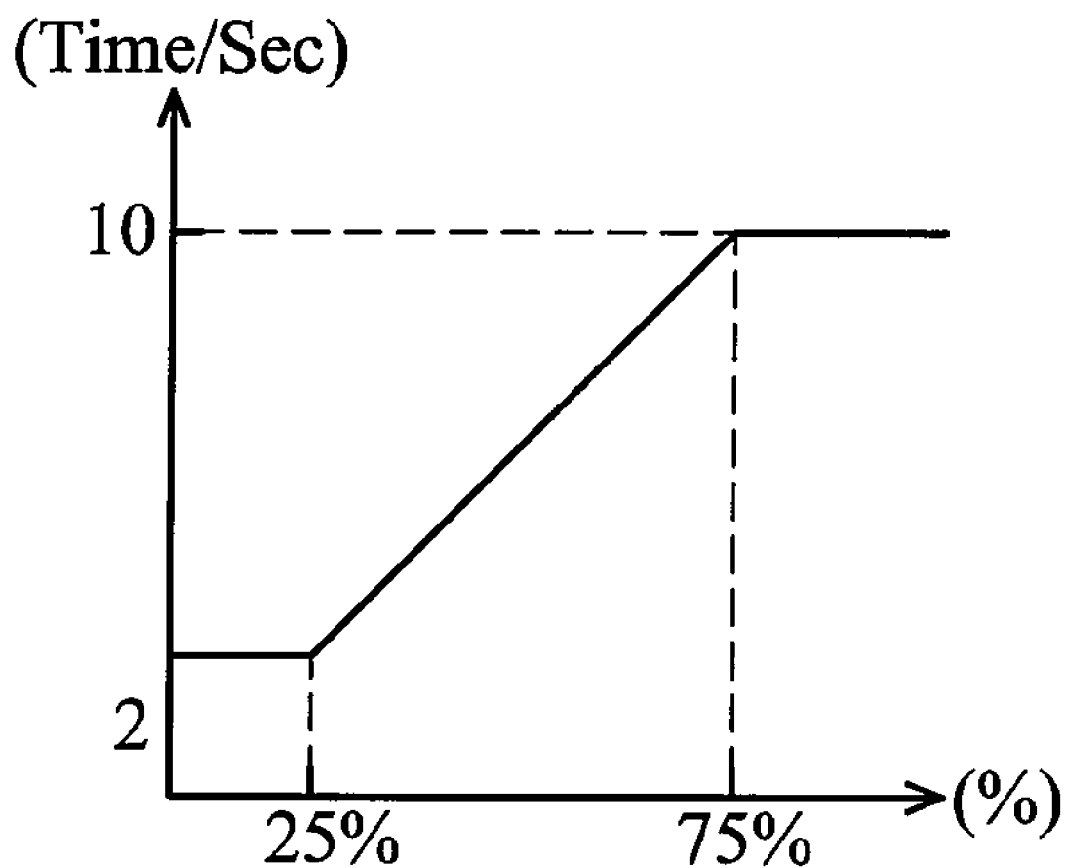
FIG. 5 shows a mapping function corresponding to instances of generating a position signal by baseband unit 122 during a one second period and the remaining capacity of the battery.

FIG. 5 shows a mapping function corresponding to instances of generating a position signal by baseband unit 122 during a one second period and the remaining capacity of the battery. When the remaining capacity of the battery is 75%, the position signal is generated by baseband unit 122 10 times during a one second period, or the position signal is generated by baseband unit 122 once every 0.1 seconds. Thus, the position locating frequency of the GPS device 100 is 10 Hz. When the remaining capacity of the battery is 25%, the position signal is generated by baseband unit 122 twice during a one second period, or the position signal is generated by baseband unit 122 once every 0.5 seconds. Thus, the position locating frequency of the GPS device 100 is 2 Hz.

In some embodiments, if the GPS device 100 is applied in a vehicle, a speed signal and a direction signal of the vehicle are obtained by processing unit 126. Baseband unit 122 generates the position signal according to the previous wireless signal group, the speed signal, and the direction signal. If antenna 121 is unable to receive the wireless signal group provided by satellites, baseband unit 122 coordinates with the previous wireless signal group, the speed signal, and the direction signal to estimate the position of the vehicle.

In summary, the number of times the position signal is generated during a one second period is not fixed. In a specific case, such as the speed of movement of the GPS device 100, the remaining capacity of the battery, or strength of the wireless signal group exceeds a preset value, the number of times the position signal is generated by baseband unit is reduced, or the duration of the time interval is increased. Thus, the power consumption is reduced because the position locating frequency is reduced.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A global positioning system (GPS) device, comprising:
    an antenna receiving a wireless signal group from at least two satellites; and
    a baseband unit processing the wireless signal group to generate a position signal, wherein the position signal is updated every time interval, and the duration of the time interval is changed dynamically according to at least one of:
    a remaining capacity of a power source of the GPS device,
    a number of the satellites, and
    a movement path of the GPS device.

2. The GPS device as claimed in claim 1, wherein the duration of the time interval is reduced when the remaining capacity of the battery exceeds a preset value.

3. The GPS device as claimed in claim 1, wherein the duration of the time interval is reduced when the number of the satellites exceeds a preset value.

4. A method for a global positioning system (GPS) device, comprising:
    receiving a wireless signal group from at least two satellites;
    processing the wireless signal group to generate a position signal; and
    updating the position signal every time interval, wherein the duration of the time interval is changed dynamically according to at least one of:
    a remaining capacity of a power source of the GPS device,
    a number of the satellites, and
    a movement path of the GPS device.

5. The method as claimed in claim 4, wherein the duration of the time interval is reduced when the remaining capacity of the battery exceeds a preset value.

6. The method as claimed in claim 4, wherein the duration of the time interval is reduced when the number of the satellites exceeds a preset value.

7. The method as claimed in claim 4, wherein the duration of the time interval is reduced when the GPS device moves in a single direction.

8. The GPS device as claimed in claim 1, wherein the duration of the time interval is reduced when the GPS device moves in a single direction.

9. A baseband unit of a global positioning system (GPS) device with an antenna receiving a wireless signal group from at least two satellites, said baseband unit processing the wireless signal group to generate a position signal, wherein the position signal is updated every time interval, and the duration of the time interval is changed dynamically according to at least one of:
    a remaining capacity of a power source of the GPS device,
    a number of the satellites, and
    a movement path of the GPS device.

* * * * *